US012621887B2

(12) United States Patent
Khalid

(10) Patent No.: US 12,621,887 B2
(45) Date of Patent: May 5, 2026

(54) OUT-OF-NETWORK SIDE-LINK COMMUNICATIONS BETWEEN DSDS DEVICES

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 391 days.

(21) Appl. No.: 18/455,219

(22) Filed: Aug. 24, 2023

(65) Prior Publication Data

US 2025/0071833 A1 Feb. 27, 2025

(51) Int. Cl.
| | |
|---|---|
| *H04M 3/42* | (2006.01) |
| *H04W 8/02* | (2009.01) |
| *H04W 72/40* | (2023.01) |
| *H04W 76/14* | (2018.01) |
| *H04W 88/06* | (2009.01) |

(52) U.S. Cl.
CPC ............. *H04W 76/14* (2018.02); *H04W 8/02* (2013.01); *H04W 72/40* (2023.01); *H04W 88/06* (2013.01)

(58) Field of Classification Search
CPC ....... H04W 76/14; H04W 8/02; H04W 72/40; H04W 88/06
USPC .................................... 455/414.1, 432.1, 433
See application file for complete search history.

(56) References Cited

U.S. PATENT DOCUMENTS

| | | | | |
|---|---|---|---|---|
| 2019/0110236 A1* | 4/2019 | Huang | .............. | H04W 36/0027 |
| 2020/0169858 A1* | 5/2020 | Hu | ......................... | H04W 8/183 |
| 2021/0368565 A1* | 11/2021 | Wu | ........................ | H04L 5/0055 |
| 2022/0053520 A1* | 2/2022 | Purkayastha | ..... | H04W 72/1263 |
| 2022/0053586 A1* | 2/2022 | Purkayastha | ........... | H04W 8/20 |
| 2022/0264506 A1* | 8/2022 | Kiss | ...................... | H04W 68/02 |
| 2022/0337975 A1* | 10/2022 | Krishnamoorthy | ... | H04W 60/04 |
| 2023/0033619 A1* | 2/2023 | Lovlekar | ............. | H04W 72/541 |
| 2023/0127705 A1* | 4/2023 | Ozturk | ................... | H04W 76/15 370/329 |
| 2023/0156575 A1* | 5/2023 | Sheik | .................... | H04W 76/15 370/329 |
| 2023/0239802 A1* | 7/2023 | Kumar | ................ | H04W 52/245 370/318 |
| 2023/0247701 A1* | 8/2023 | Ozturk | ................... | H04W 76/15 370/329 |
| 2023/0254918 A1* | 8/2023 | Gurumoorthy | ......... | H04W 8/24 455/435.1 |
| 2023/0269702 A1* | 8/2023 | Zhang | ................... | H04W 68/12 455/558 |

(Continued)

*Primary Examiner* — Marceau Milord
(74) *Attorney, Agent, or Firm* — Mendelsohn Dunleavy, P.C.; Steve Mendelsohn

(57) ABSTRACT

When two dual-SIM, dual-subscription (DSDS) wireless devices are located outside of their own (first) network operator's coverage area, but inside the coverage area of a second network operator having a roaming agreement with the first operator, the two devices are instructed to transmit data directly to one another via a side-link that is instigated and approved by the first operator, thereby reducing fees owed by the first operator to the second operator for the inter-device communications. In one implementation, the first operator secures a channel grant for the side-link from a CBRS SAS, and synchronization information for the side-link is provided to the two devices by the second operator.

32 Claims, 5 Drawing Sheets

(56)          References Cited

U.S. PATENT DOCUMENTS

| | | | |
|---|---|---|---|
| 2023/0300923 A1* | 9/2023 | Purkayastha | H04W 76/34 |
| | | | 370/254 |
| 2023/0345393 A1* | 10/2023 | Khalid | H04W 76/14 |
| 2023/0362978 A1* | 11/2023 | Xie | H04L 5/0096 |
| 2024/0032124 A1* | 1/2024 | Peddiraju | H04W 76/16 |
| 2024/0251362 A1* | 7/2024 | Guo | H04W 56/0045 |
| 2024/0323669 A1* | 9/2024 | Lovlekar | H04W 8/183 |
| 2024/0349225 A1* | 10/2024 | Vegesna | G01S 19/46 |
| 2025/0063581 A1* | 2/2025 | Khalid | H04W 72/51 |

* cited by examiner

120(2) OPERATOR 2 CORE

123

120(1) OPERATOR 1 CORE

121(2)

121(1)

122(2)

122(1)

110(1)

111(1)

113

111(2)

110(2)

124(2)

124(1)

500

502 TRX

504 CPU

506 MEM

OUT-OF-NETWORK SIDE-LINK COMMUNICATIONS BETWEEN DSDS DEVICES

BACKGROUND

Field of the Disclosure

The present disclosure relates to wireless cellular communications and, in particular, wireless cellular communications using dual-SIM, dual-subscription (DSDS) devices.

Description of the Related Art

This section introduces aspects that may help facilitate a better understanding of the disclosure. Accordingly, the statements of this section are to be read in this light and are not to be understood as admissions about what is prior art or what is not prior art.

It is known for two wireless network operators to have a roaming agreement that enables a subscriber of the first operator to use a dual-SIM, dual-subscription (DSDS) device that is located outside the coverage area of the first operator's wireless network, but inside the coverage area of the second operator's wireless network, to communicate via the second operator's wireless network. A DSDS device implements a connection manager, a software agent that manages the hand-in and hand-out of the DSDS device between the two wireless networks according to a set of rules for predefined conditions. In such a situation, the first operator typically pays a fee to the second operator for those communication services. It is desirable for the first operator to keep those fees low, while still enabling optimal communication services for its customers.

SUMMARY

Problems in the prior art are addressed in accordance with the principles of the present disclosure by enabling two DSDS UEs that are located outside of their (first) operator's coverage area, but within the coverage area of a second operator that has a roaming agreement with the first operator, to communicate directly with each other using a side-link that does not rely on the second operator's wireless network for the entire communication. In this way, the fees owed by the first operator to the second operator can be reduced compared to the entire communication being provided by the second operator's wireless network.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

A dual-SIM, dual-subscription (DSDS) user equipment (UE) is wireless device that has two subscriber identity module (SIM) cards that enable the UE to communicate with the wireless networks of two different wireless network operators. It is also known for two DSDS UEs that are sufficiently close to one another to communicate directly with each other using side-link communications that do not directly involve an intermediate wireless network.

Figures 1, 5:
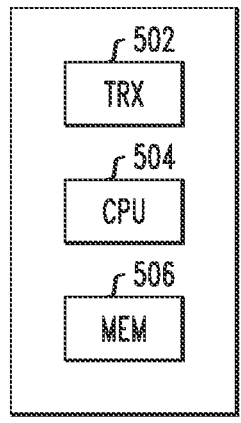
FIG. 1 is a simplified diagram representing one possible implementation of the present disclosure.
FIG. 5 is a simplified hardware block diagram of an example element that can be used to implement any of the components/functions of FIGS. 1 and 2.

FIG. 1 is a simplified diagram representing one possible implementation of the present disclosure in which wireless communications are provided within the Citizens Broadband Radio Service (CBRS) spectrum. Those skilled in the art will understand how to implement embodiments of the present disclosure for other spectrums.

FIG. 1 shows two DSDS UEs 110(1) and 110(2) that subscribe to a first wireless network operator that has a roaming agreement with a second wireless network operator, where the two UEs 110 are located outside the coverage area 122(1) of the first operator, but inside the coverage area 122(2) of the second operator, where the second operator's coverage area 122(2) is located with a region (e.g., county) in which the first operator is licensed to operate within the CBRS spectrum. As shown in FIG. 1, the two DSDS UEs 110(1) and 110(2) are able to wirelessly communicate via wireless links 111(1) and 111(2), respectively, with the second operator's base station 124(2), which communicates with the second operator's core network infrastructure 120 (2) via backend link 121(2). As part of the roaming agreement between the first and second operators, the second operator's core network 120(2) is able to communicate with the first operator's core network 120(1) via backend link 123. Because the two UEs 110 are outside of the first operator's coverage area 122(1), the two UEs 110 are not able to communicate wirelessly with the first operator's base station 124(1), which communicates with the first operator's core network 120(1) via backend link 121(1).

As shown in FIG. 1, because the two UEs 110 are DSDS devices that are sufficiently close to one another, in addition to being able to communicate with the second operator's base station 124(2), they are also able to communicate directly with each other via wireless side-link 113 without requiring an intermediate wireless network. Such direct communications between the two UEs 110 are referred to herein as side-link communications. In some situations, the first operator has licensed bandwidth within the CBRS spectrum that the first operator is not currently fully using in areas of the county where the first operator does not have CBRS coverage but does have an opportunity to offload due to the presence of its subscribers. In those situations, it may be advantageous for the first operator to have side-link communications between the two UEs 110 employ some of its unused CBRS bandwidth rather than allow the second operator to employ its unused bandwidth for those side-link communications.

According to the prior art, UE 110(1) can send a text message with an embedded file (e.g., a photo, video, or data file) to UE 110(2) with both the text message and the embedded file being transmitted (i) from UE 110(1) to the second operator's base station 124(2) via wireless link 111(1) and then (ii) from base station 124(2) to UE 110(2) via wireless link 111(2). According to embodiments of the present disclosure, some of that communication is transmitted directly from UE 110(1) to UE 110(2) via side-link 113. For example, the text message may be transmitted from UE 110(1) to UE 110(2) via wireless links 111(1) and 111(2), as in the prior art, but with the embedded file being transmitted directly from UE 110(1) to UE 110(2) via side-link 113. The disclosure is not limited to text messages. Other types of communications, such as large file transfers, data files, pictures, and other data sessions not requiring high QoS, are also possible.

Figure 2:
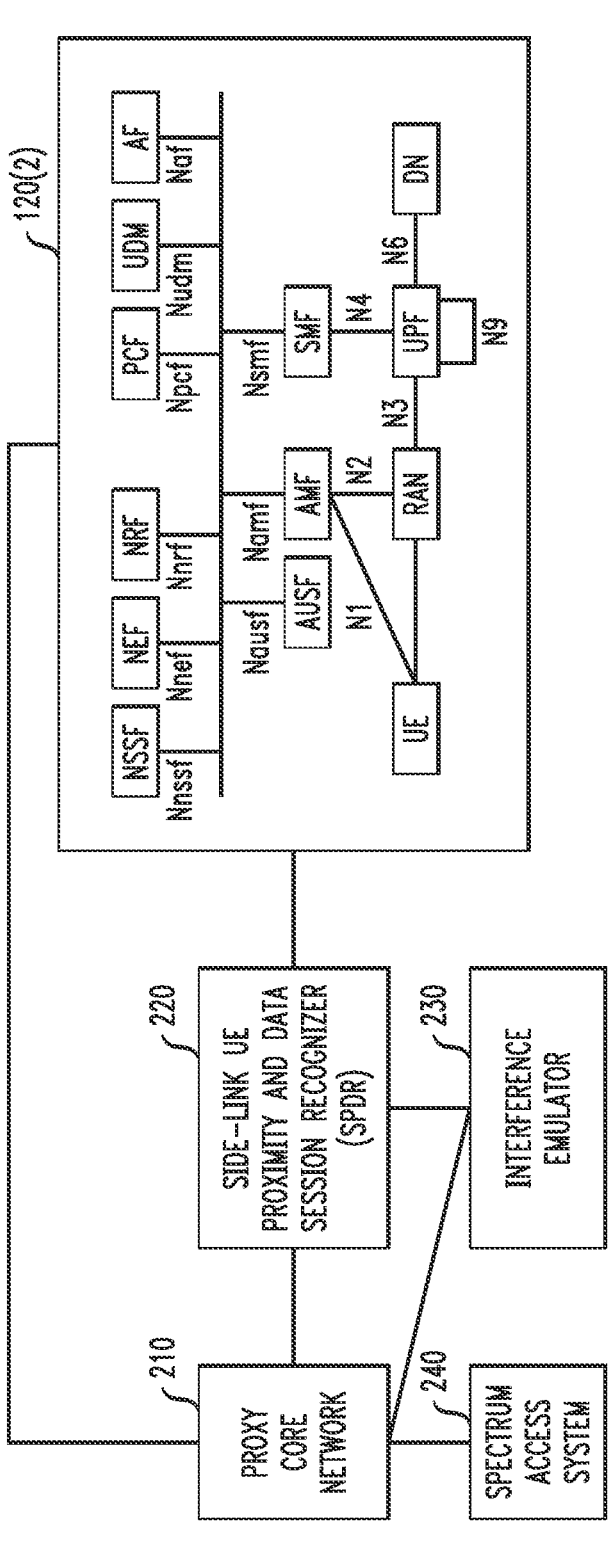
FIG. 2 is a simplified block diagram representing elements of the first and second operator's core networks of FIG. 1.

FIG. 2 is a simplified block diagram representing elements of the first and second operator's core networks 120(1) and 120(2) of FIG. 1 that support the operations of certain embodiments of the present disclosure. In particular, FIG. 2 represents the conventional elements of the second operator's core network 120(2). In addition, FIG. 2 shows three elements of the first operator's core network 120(1): proxy core network 210, side-link UE proximity and data session recognizer (SPDR) 220, and interference emulator 230. FIG. 2 also shows a conventional spectrum access system (SAS) 240.

In certain situations, the first operator operates on licensed portions of the CBRS spectrum but with limited geographical coverage (e.g., a portion of a county) even though the first operator is licensed to operate on those licensed CBRS portions in a larger region (e.g., the entire county). According to certain embodiments of the disclosure, the first operator instructs UEs that are located outside its coverage area, but within its larger licensed region to employ side-link communications using its licensed CBRS portions.

As known in the art, a SAS is responsible for the allocation of channels in the CBRS spectrum and also ensures that CBRS incumbents have clean spectrum available for communication. Embodiments of the present disclosure ensure that available channels are used in the best possible way. For example, when there is no incumbent activity, Priority Access License (PAL) users have access to their licensed channels with General Authorized Access (GAA) users able to use any remaining, unlicensed channels. Certain embodiments of the disclosure rely on a SAS to allocate CBRS bandwidth for side-link communications.

The SPDR 220 of FIG. 2 is a function within the first operator's core network infrastructure 120(1) of FIG. 1 that determines if the UEs 110 are within a distance suitable for side-link communication via the side-link 113. In addition, the SPDR 220 also identifies the data sessions that could be carried on the side-link 113. These data sessions could be real-time or non-real-time file transfers, walkie-talkie functions, video data transfers, etc. The SPDR 220 receives UE locations directly from the second operator's core network 120(2) and analyzes for feasibility of side-link communication based on the UE locations and their communication needs.

The interference emulator 230 is a function within the first operator's core network infrastructure 120(1) that determines whether the UEs 110 selected for side-link communication will cause interference with other UEs that are within the first operator's coverage area 122(1). The interference emulator 230 can use existing data from the network reported by CBRS base stations (CBSDs) to determine the usage of CBRS channels. This will help in determining the noise floor of the current network, base station measurements of the noise, channel usage from the UEs, etc. Depending on accuracy requirements and cost constraints, implementation to determine interference could be either a propagation generation system (i) in a complex form or (ii) based on empirical formulas in a simpler form.

In the complex form, the emulator 230 takes the data obtained from the proxy core 210 within the wireless network's operation and support system (OSS) to determine how much power is being transmitted by the CBSDs in the given areas and determines the noise floor of various channels. The information of the noise floor is used in determining the channel with the least amount of noise. In addition, the information is used to determine the channels that are currently in use by the first operator close to the UEs 110 (e.g., channels currently used by base station 124(1) of FIG. 1). The emulator 230 helps in the selection of a clean channel and avoids channels that are being used by the first operator within its coverage areas.

After determining the noise level of various channels, the emulator 230 uses UE capabilities, e.g., noise figure, power transmission, and modulation schemes supported, etc., along with UE-to-UE distance and RF propagation environment to determine the minimum power levels needed for the UEs 110 to directly communicate with each other with reasonable side-link data rates as determined by the network policy. The overall job of the emulator 230 is to help select a clean channel for the UE-to-UE communication to take place without harming the ongoing communication (nearby UE-to-UE or UE-to-gNodeB communications) and to keep the noise levels low in the system. The emulator 230 gets CBRS utilization data from the OSS to determine the usage of various CBRS channels and CBRS measurements in the vicinity of the proposed UE-to-UE communication to determine the noise and usage of the channels. The emulator 230 extrapolates the information to the UE locations and then determines which channel is the most suitable for the UE-to-UE communication. This will be used in calculating the interference to other UEs and overall system noise.

A simpler form would consist of a function that would quickly determine the pathloss using predetermined/calculated formulas. This will not be as accurate as the complex mechanism but would be cheaper and easier to implement. In either case, the interference emulator 230 confirms various communication parameters for a clean and effective communication, e.g., power levels for the UEs, channels for communication, etc.

The proxy core network 210 is a function within the first operator's core network infrastructure 120(1) that acts on behalf of the first operator's core network 120(1) to interact with SAS 240 and other components (not shown).

The proxy core network 210, the SPDR 220, and/or interference emulator 230 can be implemented on one or more servers and/or in the cloud, depending on the service level needed for the side-link communications. These functions could be implemented in the cloud separately. However, if they are too far apart in distance, this may affect the time within which these functions need to communicate with each other. For example, if they are within the same data center, they can communicate relatively quickly. However, if they are spread apart geographically, then the delay will take a toll on the system and subsequently affect the type of sessions that could be offloaded. The more far apart these functions are, the more time is needed for inter-component communication and, therefore, more real-time data sessions may not be off loadable. In essence, the implementation depends on the latency budget which in turn determines what type of sessions could be offloaded. For optimal performance, it is preferable to implement these three functions close to each other within the same server/cloud infrastructure pool. This will ensure efficient and close communication between the functions. This will not only provide efficient and fast communication but also reduce the complexity of implementation.

Given the situation shown in FIG. 1, if (i) one or both UEs 110 have a significant amount of data to transmit to the other UE 110, (ii) the UEs 110 are located close enough to each other to communicate directly via the side-link 113 without unreasonable pathloss, and (iii) if side-link communications between the UEs 110 will not interfere with other communications, then it may be cost-effective to support at least some of that communication using the side-link 113 instead of paying for the second operator's wireless network to support all of that communication.

Figure 3:
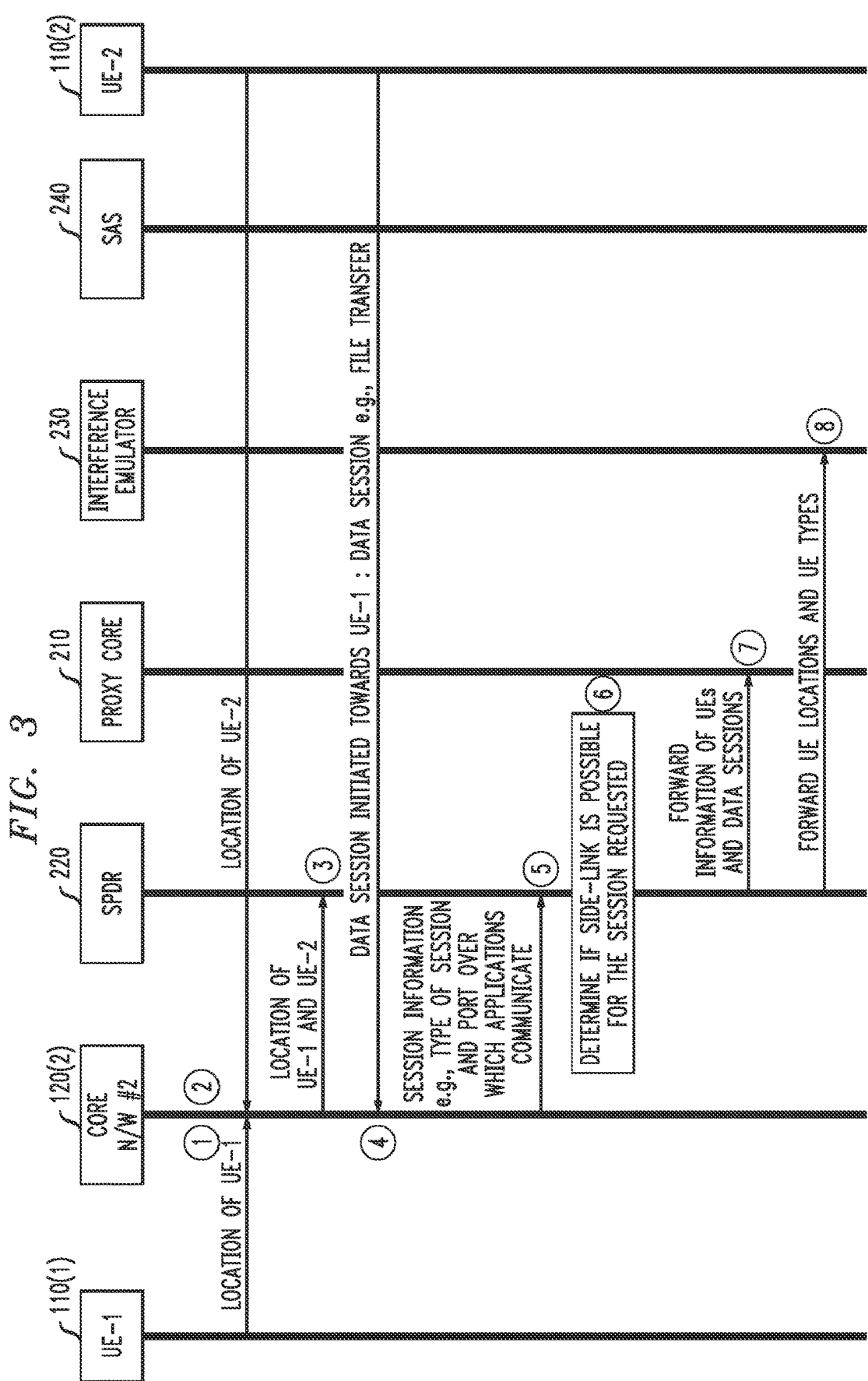
FIG. 3 is a message flow diagram showing the communications between the different elements in FIGS. 1 and 2.
Figure 3:
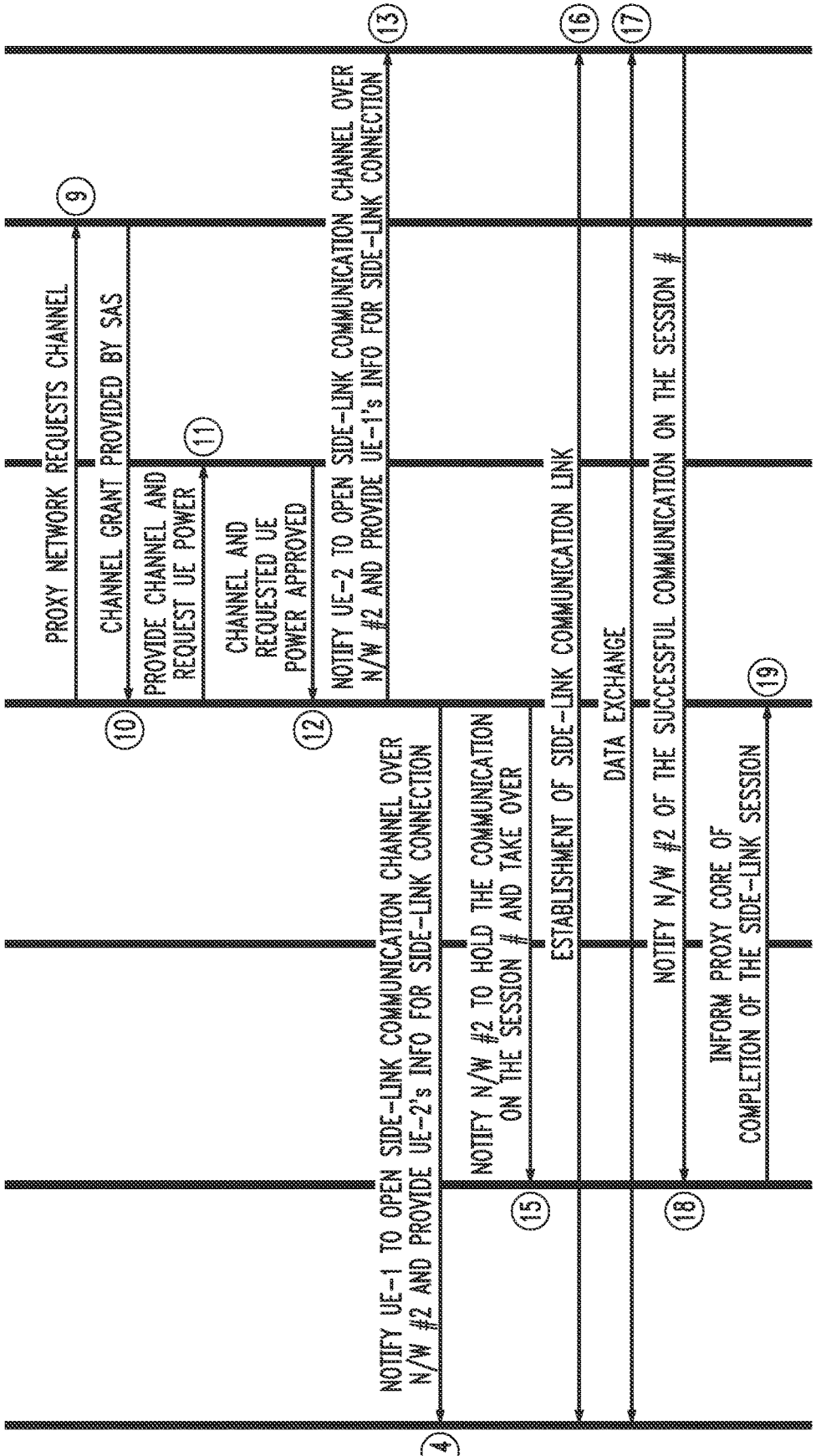

FIG. 3 is a message flow diagram showing the communications between the different elements in FIGS. 1 and 2 involved in using side-link communications between the two UEs 110 to support some of the communication services that otherwise would, according to the prior art, be provided entirely by the second operator's wireless network, thereby reducing the fees owed by the first operator to the second operator.

Prior to the establishment of side-link communications between the two UEs 110, each UE establishes a wireless link with the second operator's base station 124(2) using conventional processing. In particular, UE 110(1) establishes wireless link 111(1) with base station 124(2), and UE 110(2) establishes wireless link 111(2) with base station 124(2). As a result of establishing those wireless links, base station 124(2) provides the second operator's core network 120(2) with information about those wireless links 111, including the locations of the two UEs 110. This is represented in FIG. 3 by Steps 1 and 2, where UE 110(1) and UE 110(2) provide their respective locations to the second operator's core network 120(2). In Step 3, the second operator's core network 120(2) forwards the UE location information to the SPDR 220 of the first operator's core network 120(1).

In this particular scenario, UE 110(2) has a data file to transfer to UE 110(1). For example, the data file may be a photo embedded in a text message to be transmitted from UE 110(2) to UE 110(1). In that case, in Step 4, UE 110(2) transmits a message to the second operator's core network 120(2) via the wireless link 111(1) containing a request for the file transfer, which request includes the identification of UE 110(1) and the type of communication session desired (i.e., file transfer). In response, in Step 5, the core network 120(2) forwards information about the requested file transfer to the SPDR 220, including the identification of the two UEs 110, the type of communication session desired, and the ports on which the applications running on the two UE 110 communicate.

In general, the SPDR 220 determines which data sessions are eligible for side-link communication. In Step 6, the SPDR 220 determines that the two UEs 110 are close enough to each other to perform the requested file transfer via side-link communications. As such, in Steps 7 and 8, the SPDR 220 forwards information about the UEs and the requested data session to the proxy core 210 and to the emulator 230, respectively.

In parallel, in Step 9, the proxy core 210 requests a channel and a power level for the side-link communication from the SAS 240, and, in Step 10, the SAS 240 responds to the proxy core 210 with a channel grant for the side-link communication via side-link 113 of FIG. 1. In Step 11, the proxy core 210 provides the granted channel and the UE power level to the interference emulator 230, which determines that the requested file transfer can be transmitted via the side-link 113 without undue interference (either by the side-link communication to other communications or by those other communications to the side-link communication) and, in Step 12, informs the proxy core 210 that the requested communication via side-link 113 is approved.

In Steps 13, 14, and 15, the proxy core 210 informs the two UEs 110 and the second operator's network core 120(2), respectively, that the requested file transfer is to be executed via side-link 113. Step 14 involves notifying the UE 110(1) to prepare for an incoming side-link connection from UE 110(2) and Step 15 involves instructing the network core 120(2) to allow the specified data session to complete via the side-link connection. In Step 16, the two UEs 110 establish side-link 113, and, in Step 17, the second UE 110(2) transfers the data file to the first UE 110(1) via side-link 113. After completing the file transfer via side-link 113, in Step 18, the UE 110(2) notifies the second operator's core network 120(2) via wireless link 111(2) and base station 124(2) that the file transfer has been completed, and, in Step 19, the core network 120(2) informs the proxy core 210 that the file transfer has been completed. At that point, the side-link 113 can be either maintained or torn down depending on whether any additional data need to be transmitted between the two UEs 110.

Figure 4:
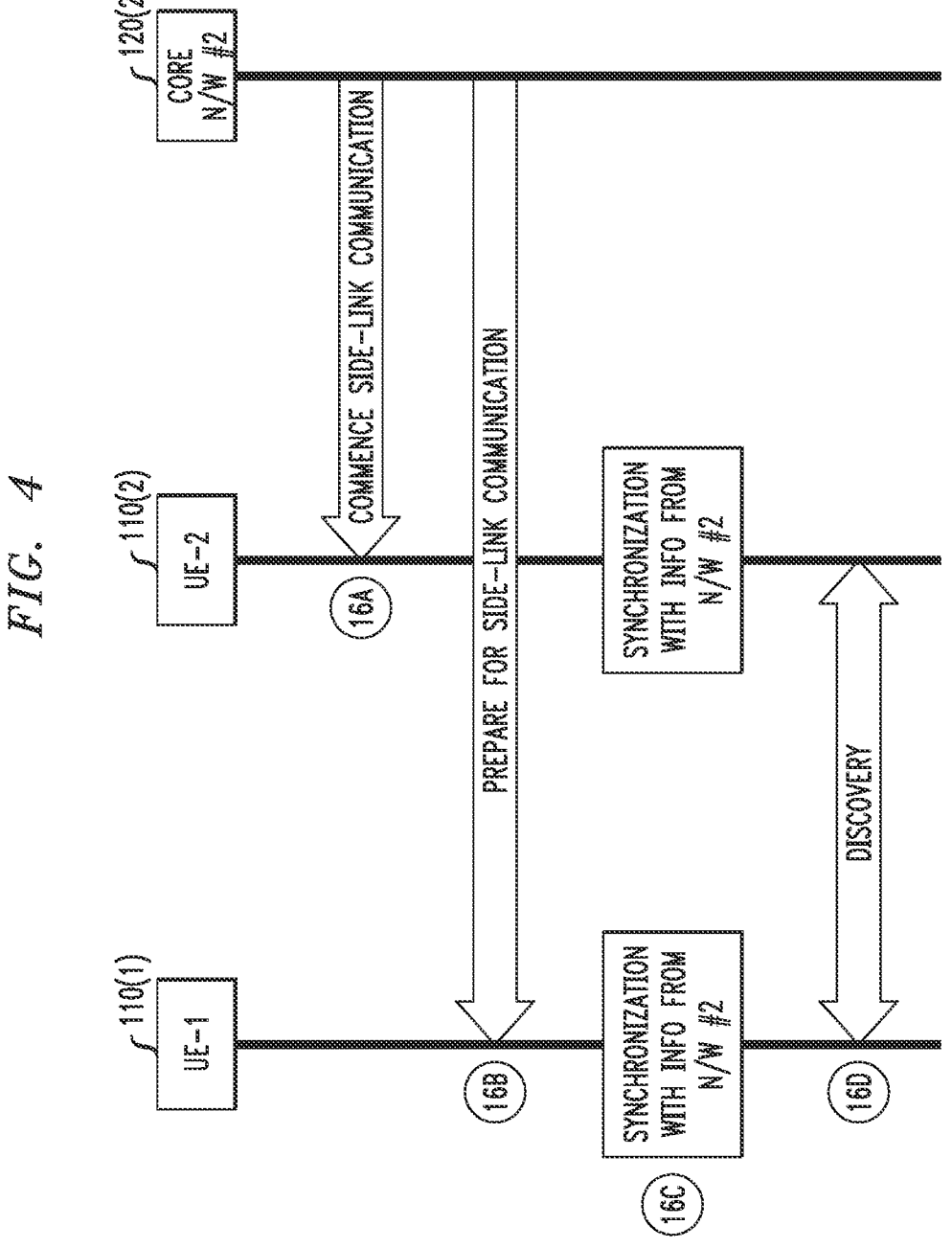
FIG. 4 is a message flow diagram showing further details about the establishment of the side-link between the two of FIG. 1 in Step 16 of FIG. 3.

FIG. 4 is a message flow diagram showing further details about the establishment of the side-link 113 between the two UEs 110 of FIG. 1 in Step 16 of FIG. 3. In Step 16A of FIG. 4, the second operator's core network 120(2) instructs UE 110(2) via wireless link 111(2) to commence side-link communication with UE 110(1), and, in Step 16B, the core network 120(2) instructs UE 110(1) via wireless link 111(1) to prepare for side-link communication with UE 110(2).

In Step 16C, the communication session is handed off to the two UEs 110 for side-link communication. In particular, the core network 120(2) provides synchronization information to the two UEs 110 via the respective wireless links 111 using master information blocks (MIBs) and system information blocks (SIBs) to enable the UEs 110 to perform 5G New Radio (NR) synchronization to establish side-link 113 and share information over Primary Sync Signal (PSS) and Secondary Sync Signal (SSS). Since the UEs 110 are DSDS devices, they obtain a common time source for their side-link communication from the core network 120(2).

In Step 16D, the UEs 110 discover each other and agree on resources using Type 2B communication, UE-specific, semi-persistent, resource allocation, as dictated by 3GPP LTE release 14 and 3GPP 5G NR release 16/17, the teachings of which are incorporated herein in their entirety. After the UEs have completed the discovery process of Step 16D, they are ready to transfer data according to Step 17 of FIG. 3.

FIG. 5 is a simplified hardware block diagram of an example element 500 that can be used to implement any of the components/functions of FIGS. 1 and 2. As shown in FIG. 5, the element 500 includes (i) communication hardware (e.g., wireless, wireline, and/or optical transceivers (TRX)) 502 that supports communications with other components/functions, (ii) a processor (e.g., CPU microprocessor) 504 that controls the operations of the element 500, and (iii) a memory (e.g., RAM, ROM) 506 that stores code executed by the processor 504 and/or data generated and/or received by the element 500.

Although the disclosure has been described in the context of one-to-one side-link communications, in other implementations, side-link communications may be one-to-many communications from one UE to two or more other UEs at the same time.

In certain embodiments of the present disclosure, a first wireless network operator's network core comprises at least one processor configured to control one or more transceivers to enable the network core to (i) receive incoming information from a second wireless network operator about a communication session between two wireless devices that subscribe to the first wireless network operator; (ii) determine that the communication session should include direct communication between the two wireless devices via a side-link; and (iii) transmit outgoing information to the second wireless service operator to enable the two wireless devices to establish the side-link to communicate directly with each other.

In at least some of the above embodiments, the first wireless network operator has a roaming agreement with the second wireless network operator.

In at least some of the above embodiments, the two wireless devices are DSDS devices.

In at least some of the above embodiments, the two wireless devices are located within a coverage area of the second wireless network operator, but outside of the first wireless network operator's coverage area.

In at least some of the above embodiments, the incoming information comprises identities and locations of the two wireless devices and a type of communication for the communication session.

In at least some of the above embodiments, the network core is configured to determine that the communication session should include the direct communication between the two wireless devices via the side-link based on (i) distance between the two wireless devices, (ii) predicted pathloss between the two wireless device, and (iii) predicted interference resulting from the direct communication.

In at least some of the above embodiments, the outgoing information comprises a channel and a power level for the side-link.

In at least some of the above embodiments, the network core is configured to secure a channel grant for the side-link in a CBRS spectrum from a SAS.

In certain other embodiments of the present disclosure, a wireless device is configured to subscribe to a first wireless network operator, the wireless device comprising at least one processor configured to control one or more transceivers to enable the wireless device to (i) transmit, to a second wireless network operator, a request to transmit data in a communication session with an other wireless device; (ii) receive, from the second wireless network operator, instructions to perform at least part of the communication session in direct communication with the other wireless device via a side-link; (iii) establish the side-link with the other wireless device; and (iv) transmit at least some of the data directly to the other wireless device via the side-link.

In at least some of the above embodiments, the first wireless network operator has a roaming agreement with the second wireless network operator.

In at least some of the above embodiments, the wireless device and the other wireless device are DSDS devices.

In at least some of the above embodiments, the wireless device and the other wireless device are located within a coverage area of the second wireless network operator, but outside of the first wireless network operator's coverage area.

In at least some of the above embodiments, the request to transmit the data comprises the wireless device's location, the other wireless device's identity, and a type of communication for the communication session.

In at least some of the above embodiments, the instructions comprise a channel and a power level for the side-link.

In at least some of the above embodiments, the channel is in a CBRS spectrum.

In at least some of the above embodiments, the wireless device is configured to receive synchronization information for the side-link from the second wireless network operator.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits.

The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A first wireless network operator's network core comprising at least one processor configured to control one or more transceivers to enable the network core to:

receive incoming information from a second wireless network operator about a communication session between two wireless devices that subscribe to the first wireless network operator, but not to the second wireless network operator;

determine that the communication session should include direct communication between the two wireless devices via a side-link; and transmit outgoing information to the second wireless service operator to enable the two wireless devices to establish the side-link to communicate directly with each other, wherein the two wireless devices are located within a coverage area of the second wireless network operator, but outside of the first wireless network operator's coverage area.

2. The network core of claim 1, wherein the first wireless network operator has a roaming agreement with the second wireless network operator.

3. The network core of claim 1, wherein the two wireless devices are dual-SIM dual-subscription (DSDS) devices.

4. The network core of claim 1, wherein the incoming information comprises identities and locations of the two wireless devices and a type of communication for the communication session.

5. The network core of claim 1, wherein the network core is configured to determine that the communication session should include the direct communication between the two wireless devices via the side-link based on (i) distance between the two wireless devices, (ii) predicted pathloss between the two wireless devices, and (iii) predicted interference resulting from the direct communication.

6. The network core of claim 1, wherein the outgoing information comprises a channel and a power level for the side-link.

7. The wireless device of claim 1, wherein the network core is configured to secure a channel grant for the side-link in a Citizens Broadband Radio Service (CBRS) spectrum from a spectrum access system (SAS).

8. The wireless device of claim 1, wherein:

the first wireless network operator has a roaming agreement with the second wireless network operator;

the two wireless devices are DSDS devices;

the incoming information comprises identities and locations of the two wireless devices and a type of communication for the communication session;

the network core is configured to determine that the communication session should include the direct communication between the two wireless devices via the side-link based on (i) distance between the two wireless devices, (ii) predicted pathloss between the two wireless device, and (iii) predicted interference resulting from the direct communication;

the outgoing information comprises a channel and a power level for the side-link; and the network core is configured to secure a channel grant for the side-link in a CBRS spectrum from a SAS.

9. A method for first wireless network operator's network core, the method comprising the network core:

receiving incoming information from a second wireless network operator about a communication session between two wireless devices that subscribe to the first wireless network operator, but not to the second wireless network operator;

determining that the communication session should include direct communication between the two wireless devices via a side-link; and transmitting outgoing information to the second wireless service operator to enable the two wireless devices to establish the side-link to communicate directly with each other, wherein the two wireless devices are located within a coverage area of the second wireless network operator, but outside of the first wireless network operator's coverage area.

10. The method of claim 9, wherein the first wireless network operator has a roaming agreement with the second wireless network operator.

11. The method of claim 9, wherein the two wireless devices are DSDS devices.

12. The method of claim 9, wherein the incoming information comprises identities and locations of the two wireless devices and a type of communication for the communication session.

13. The method of claim 9, wherein the network core determines that the communication session should include the direct communication between the two wireless devices via the side-link based on (i) distance between the two wireless devices, (ii) predicted pathloss between the two wireless devices, and (iii) predicted interference resulting from the direct communication.

14. The method of claim 9, wherein the outgoing information comprises a channel and a power level for the side-link.

15. The method of claim 9, wherein the network core secures a channel grant for the side-link in a CBRS spectrum from a SAS.

16. The method of claim 9, wherein:

the first wireless network operator has a roaming agreement with the second wireless network operator;

the two wireless devices are DSDS devices;

the incoming information comprises identities and locations of the two wireless devices and a type of communication for the communication session;

the network core determines that the communication session should include the direct communication between the two wireless devices via the side-link based on (i) distance between the two wireless devices, (ii) predicted pathloss between the two wireless device, and (iii) predicted interference resulting from the direct communication;

the outgoing information comprises a channel and a power level for the side-link; and the network core secures a channel grant for the side-link in a CBRS spectrum from a SAS.

17. A wireless device configured to subscribe to a first wireless network operator, but not to a second wireless network operator, the wireless device comprising at least one processor configured to control one or more transceivers to enable the wireless device to:

transmit, to the second wireless network operator, a request to transmit data in a communication session with an other wireless device;

receive, from the second wireless network operator, instructions to perform at least part of the communication session in direct communication with the other wireless device via a side-link;

establish the side-link with the other wireless device; and transmit at least some of the data directly to the other wireless device via the side-link, wherein the wireless device and the other wireless device are located within a coverage area of the second wireless network operator, but outside of the first wireless network operator's coverage area.

18. The wireless device of claim 17, wherein the first wireless network operator has a roaming agreement with the second wireless network operator.

19. The wireless device of claim 17, wherein the wireless device and the other wireless device are DSDS devices.

20. The wireless device of claim 17, wherein the request to transmit the data comprises the wireless device's location, the other wireless device's identity, and a type of communication for the communication session.

21. The wireless device of claim 17, wherein the instructions comprise a channel and a power level for the side-link.

22. The wireless device of claim 21, wherein the channel is in a CBRS spectrum.

23. The wireless device of claim 17, wherein the wireless device is configured to receive synchronization information for the side-link from the second wireless network operator.

24. The wireless device of claim 17, wherein:

the first wireless network operator has a roaming agreement with the second wireless network operator;

the wireless device and the other wireless device are DSDS devices;

the request to transmit the data comprises the wireless device's location, the other wireless device's identity, and a type of communication for the communication session;

the instructions comprise a channel and a power level for the side-link;

the channel is in a CBRS spectrum; and the wireless device is configured to receive synchronization information for the side-link from the second wireless network operator.

25. A method for a wireless device that subscribes to a first wireless network operator, but not to a second wireless network operator, the method comprising the wireless device:

transmitting, to the second wireless network operator, a request to transmit data in a communication session with an other wireless device;

receiving, from the second wireless network operator, instructions to perform at least part of the communication session in direct communication with the other wireless device via a side-link;

establishing the side-link with the other wireless device; and transmitting at least some of the data directly to the other wireless device via the side-link, wherein the wireless device and the other wireless device are located within a coverage area of the second wireless network operator, but outside of the first wireless network operator's coverage area.

26. The method of claim 25, wherein the first wireless network operator has a roaming agreement with the second wireless network operator.

27. The method of claim 25, wherein the wireless device and the other wireless device are DSDS devices.

28. The method of claim 25, wherein the request to transmit the data comprises the wireless device's location, the other wireless device's identity, and a type of communication for the communication session.

29. The method of claim 25, wherein the instructions comprise a channel and a power level for the side-link.

30. The method of claim 29, wherein the channel is in a CBRS spectrum.

31. The method of claim 25, wherein the wireless device is configured to receive synchronization information for the side-link from the second wireless network operator.

32. The method of claim 25, wherein:

the first wireless network operator has a roaming agreement with the second wireless network operator;

the wireless device and the other wireless device are DSDS devices;

the request to transmit the data comprises the wireless device's location, the other wireless device's identity, and a type of communication for the communication session;

the instructions comprise a channel and a power level for the side-link;

the channel is in a CBRS spectrum; and the wireless device receives synchronization information for the side-link from the second wireless network operator.

* * * * *